May 23, 1950  G. E. ROWE  2,508,891
APPARATUS FOR FORMING GLASSWARE
Filed May 4, 1946
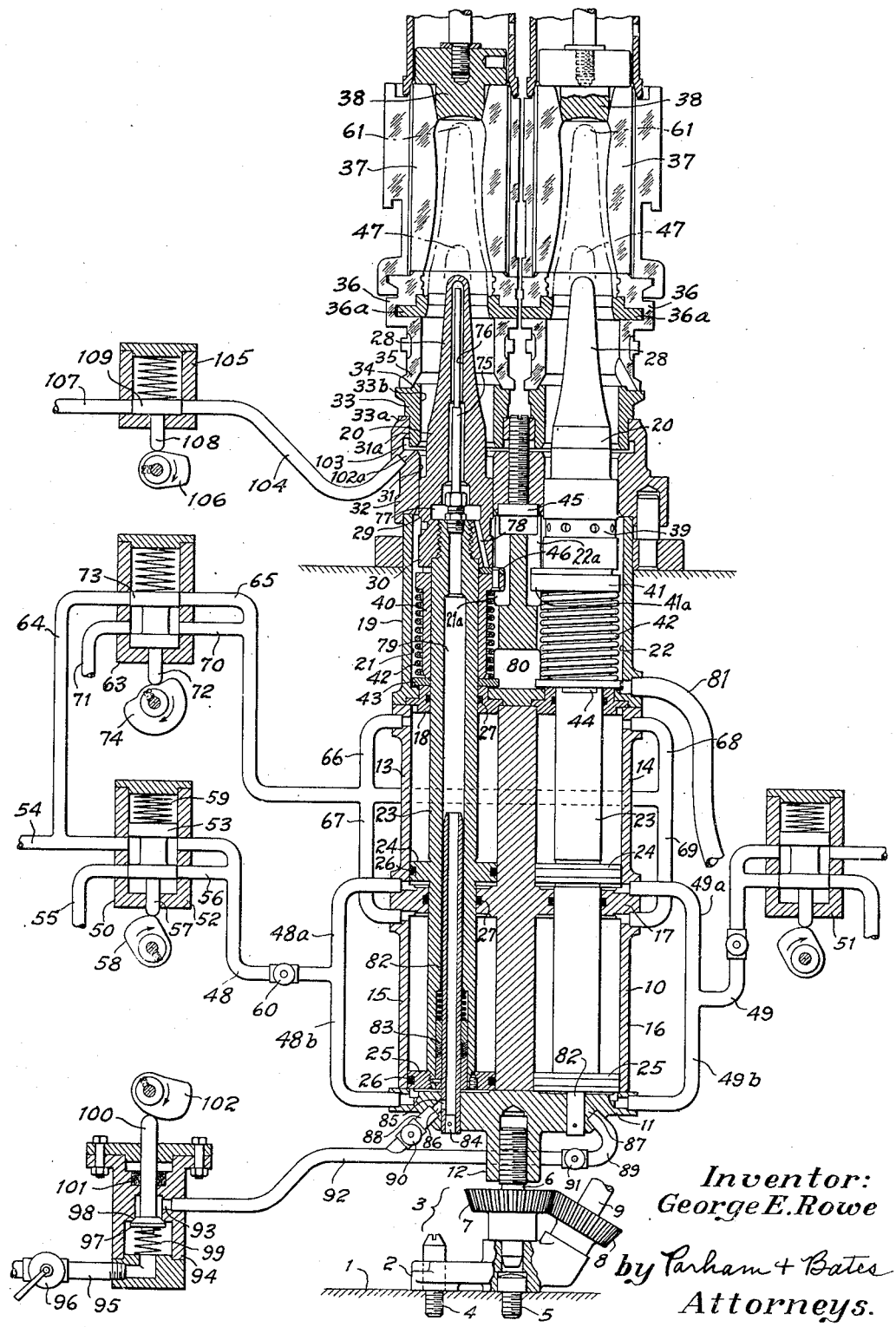
Inventor:
George E. Rowe
by Parham + Bates
Attorneys.

Patented May 23, 1950

2,508,891

UNITED STATES PATENT OFFICE 2,508,891

APPARATUS FOR FORMING GLASSWARE

George E. Rowe, Wethersfield, Conn., assignor to Hartford-Empire Company, Hartford, Conn., a corporation of Connecticut Application May 4, 1946, Serial No. 667,366

9 Claims. (Cl. 49—29)

This invention relates to the manufacture of articles of glassware, such as bottles, jars and other containers and is primarily concerned with improvements in apparatus for forming glass charges into hollow glass bodies, especially hollow parisons having neck finish or finished rim portions at the open ends thereof.

Heretofore, the practices of the glass making art have utilized means for forming glass charges into hollow glass parisons by procedures which involve the delivery of each such charge from a producing agency downwardly into a parison forming unit comprising an inverted parison body mold and an inverted neck mold at the lower end of the body mold. A bottom plate or baffle may then be placed on the inverted body mold to complete the cavity of the forming unit.

In one apparatus employing this procedure, downward movement of the charge is checked at a predetermined level within the forming unit so that the charge is supported as an entity at its axis by a tapering upper end portion of a vertically moving pressing plunger. Glass of the charge at the periphery thereof may shift or creep downwardly on the plunger. Such an apparatus is disclosed in Patent No. 2,289,046, granted to me on July 7, 1942. In accordance with the disclosure made therein, the charge is raised as an entity by an upward axial movement of the plunger in the forming unit to press from within the charge part of the glass into molding contact with the walls of the cavity of the forming unit. The hollow parison thus formed may be transferred by a bodily movement of the neck mold to another station at which the parison may be formed in a final blow mold into an article of the final shape desired, the parison body mold of course having first been opened to permit such bodily movement of the neck mold and parison supported thereby.

The present invention provides improvements in apparatus over that disclosed in the hereinbefore mentioned Patent No. 2,289,046 and also over the apparatus disclosed in my copending prior application Serial No. 410,747, filed September 13, 1941, entitled "Apparatus for and method of forming glassware."

An object of the present invention is to provide an improved structure for guiding, positioning and operating a plurality of pressing plungers in a single apparatus to form substantially simultaneously a plurality of hollow glass parisons or hollow bodies according to the general procedure above described, such improved structure being constructed and arranged to simultaneously retract the plurality of plungers downwardly, after an individually controlled upward pressing stroke of each, to a level below that at which the upwardly moving plunger tips first contact separate glass charges to check downward movement of the latter in the forming unit, and thereafter to move the plungers simultaneously upward to their glass charge contacting positions from which they individually are moved upwardly for their next glass-pressing strokes. The simultaneous downward retraction of the plungers after their individually effected pressing strokes provides clearance for simultaneous movement of the neck molds to transfer the pressed hollow parisons along a desired path to adjacent laterally spaced stations at which such parisons may receive further treatment or handling.

Another object of the invention is to provide improved and novel means for simultaneously cooling the interiors of the several pressing plungers so as to permit individually regulable control of the temperature of the glass contacting portion of each.

A further object of the invention is to provide apparatus wherein the upward pressing strokes of the several pressing plungers are produced and suitably coordinated by an operating mechanism which will occupy a space of only relatively little horizontal dimension but will impel the plungers upwardly smoothly and powerfully.

Still another object of the invention is to provide a single apparatus having a plurality of parison forming plungers and their supporting positioning and operating means and cooling provisions, all constructed and arranged to form a unitary structure which is sufficiently compact to be mounted for operation in approximately the same space as that utilized by the single pressing plunger apparatus of my hereinbefore mentioned application, Serial No. 410,747.

Other objects and advantages of the invention hereinafter will be pointed out or become obvious from the following description of one embodiment of the present invention, as shown in the accompanying drawing, and of the use thereof to form a plurality of mold charges into hollow glass bodies.

In the drawing:

The view is a vertical section through an assembly of a parison forming unit including a pair of vertical pressing plungers together with improved means for guiding, positioning and for operating the plungers and for cooling them.

As illustrated in the drawing, an assembly of parts provided in accordance with the present invention may rest upon a supporting base 1 which may be the base of a complete glassware forming machine (not shown). A socket base member 2 of a beveled gear screw jack mechanism 3 stands upon the base 1 and is positioned and secured against displacements from a desired position thereon by any suitable means, as by the fastening devices indicated at 4 and 5, respectively.

The socket base member 2 rotatably supports the lower end of a vertically disposed jack screw shaft 6. Fastened to the shaft 6 is a bevel gear 7 which operatively engages a like bevel gear 8 secured to a crank shaft 9 which is rotatably supported at one end by the socket member 2.

A motor casting or block 10 of a dual-bore vertically disposed pneumatic motor is secured to a lower head member 11 having a depending tubular extension 12 which is internally threaded to receive the threaded upper end of the vertical jack screw shaft 6. The arrangement is such as to support the casting 10 in vertical position above the base 1 at a height which can be adjusted vertically within limits by rotating the crank shaft 9 of the jack mechanism.

With more specific reference to the construction of the pneumatic motor, the casting 10 is bored from both ends to provide a pair of parallel upper pneumatic cylinders 13 and 14 and respectively aligned lower cylinders 15 and 16 which are separated from the upper cylinders by an intermediate integral head 17. A top head 18 surmounts the casting 10 and acts both as the upper head of the cylinders 13 and 14 and also as the lower head or block for a holder 19 for elements of guiding and positioning units for a pair of inverted pressing plungers 20. More particularly, the holder 19 is provided with a pair of cylindrical bores 21 and 22 axially aligned, respectively, with the pneumatic cylinders 13 and 14 of like bore.

Inasmuch as the plunger guiding and positioning units are identical, the parts thereof hereinafter will be described where possible with reference to a single unit.

As illustrated in the drawing, each plunger guiding and positioning unit includes a hollow piston rod 23 having a pair of spaced upper and lower pistons 24 and 25 secured thereto so as to operate respectively in a pair of upper and lower pneumatic cylinders 13, 15, or 14, 16. A suitable hydraulic packing ring 26 is disposed between each piston 24 and 25 and the adjacent cooperating cylinder wall. Likewise hydraulic packing rings 27 are disposed between each piston rod 23 and the intermediate and upper heads 17 and 18.

The upper end of each rod 23 is secured to the lower end of a pressing plunger 20 having a tapered tip 28. Each plunger is enlarged at one or more places, as at 29 and 30, to provide bearing surfaces in close sliding contact with internal cylindrical walls 31 of plunger guides 32 mounted on the upper end of the holder 19. Each plunger guide 32 has an enlarged cylindrical bore 31a at its upper end which is adapted to receive the lower end of a neck mold supporting ring 33 having an annular shoulder 33a supported on the guide 32. The rings 33 have internal cylindrical bores 33b of the same diameter as the plunger guides 32. Each ring 33 is provided at its top with a conical annular seat 34. Complementary portions 35 of neck mold 36 are adapted to fit the annular seats 34 accurately when the neck molds 36 are brought to operative positions with respect to their respective plungers 20. The neck molds 36 may be formed of half sections, as is usual, such half sections being carried and operated by suitable holders, not shown, such for example as those of the Hartford-Empire I. S. forming machine, as disclosed in the Ingle Patent No. 1,911,119, granted May 23, 1933. The neck rings on molds may operatively support thimbles 36a.

Each neck mold 36 is designed to cooperate with a body mold 37 and, like the neck mold, may be formed of cooperating halves supported and operated by suitable structural parts, not shown, such, for example, as those provided for the blank mold halves in the aforesaid Ingle Patent No. 1,911,119. Each body mold 37 may be locked to its aligned neck mold 36 when the body mold halves are closed about the closed neck mold. The cavity within each body mold 37 is temporarily open at its top to permit downward passage of a charge of molten glass after each mold cavity is closed at its top by suitable bottom plates or baffles 38. The latter may be supported and moved operatively in timed relation with the movement of the other parts of the parison forming units by structure such as disclosed for that purpose in the Ingle Patent No. 1,911,119.

Each mold set consisting of a plate 38, body mold 37 and neck mold 36 is secured together in alignment by their engaging portions as is usual in the case of glassware forming machinery of the type disclosed in the Ingle patent. When both of the neck mold and thimble assemblies are disposed upon the upper end of their respective plunger guides as shown in the drawing, accurate alignment of such assemblies with their respective plunger guides and hence with their respective cooperating pressing plungers 20 may be secured and maintained by the use of suitable locking means, such for example as that disclosed in my aforementioned copending application, Serial No. 410,747, filed Sept. 13, 1941.

Each plunger 20 includes a spanner annulus 39 including spaced spanner holes by means of which each plunger may be unscrewed from its rod 23 and thereafter replaced by a plunger of different tip configuration or size to conform to different neck and parison molds.

A spring-pressed sleeve 40 surrounds the upper portion of each rod 23 within the cylinder 21 or 22 and is integral with or joined in any suitable manner to a plunger lifting disk 41.

A coil spring 42 surrounds each sleeve 40 between the flanged upper end or lifting disk 41 and a stationary thrust ring 43 which is located in the bottom of each cylinder 21 or 22. Each rod 23 is milled flat along a longitudinal portion to provide a vertical guide flat 44 which cooperates with an internal parallel surface (not shown) in the sleeves 40 to prevent rotation of the rod relative to the sleeve. An ear 41a projects from each disk 41 and cooperates with vertical grooves 21a and 22a to prevent rotation while permitting vertical reciprocation of the sleeves 40. Rotation of the rods 23 thus is prevented and each plunger 20 may be unscrewed from its supporting rod, as by means of the spanner ring 39.

A single vertically adjustable stop screw 45 threaded through the upper portion of the guide casting 32 intermediate the two plungers 20, 20 provides a common stop for a contact 46 riveted or otherwise secured to the flange 41 of each sleeve 40.

Plunger operating provisions

Whenever the pressure within the cylinders 13, 15 or 14, 16 above the pair of pistons 24, 25 on either of the piston rods 23, 23 is relieved, the spring 42 associated with that rod acts to lift the sleeve 40, the disk 41 and the plunger 20 as a unit until the sleeve contact 46 strikes the stop screw 45. This will dispose the tips of both plungers 20, 20 in their glass charge receiving positions 47. This position of each plunger is that at which the plunger initially contacts the glass charge when the mold is charged or loaded.

The limit of the pressing stroke of each plunger 20, 20 is determined by the glass of each charge as such glass is pressed to form the hollow body of the shape desired. The external configuration of this hollow body is fixed by the configuration of the glass molding walls of the cavity of the assembled body mold 37, closure member 38, and neck mold 36. The internal configuration of the hollow glass body is determined by the shape of the portion of the pressing plunger 20 in contact with the glass at the end of the pressing stroke.

Any variation in the weight of the charge from the exact weight desired is reflected in the thickness of the wall of the hollow article. It is desirable that the charges shall be of exactly the predetermined weight desired but in actual practice it may not be possible to continuously maintain this desirable condition and slight weight variations are permissible. The relative positions of the two plungers 20, 20 at the end of their pressing strokes may vary slightly according to variations in weight of the charges that have been pressed. I have found it desirable to control the supply of fluid pressure to the set of pistons for each plunger actuating rod 23 separately. Accordingly, the operating pressure fluid is supplied separately to the pairs of pistons 24, 25 through separate delivery lines 48 and 49 controlled respectively by separate valves 50 and 51. As is illustrated in the drawing, the pressure fluid delivery line 48 divides into two branch delivery lines 48a and 48b, the former communicating with the interior of the left-hand upper cylinder 13, and the latter communicating with the interior of the left-hand lower cylinder 15, at the bottoms thereof. The valve 50 which controls the fluid pressure line 48 comprises a casing 52 in which is disposed a slide valve member 53 constructed and arranged to provide, in one position of the member 53, communication between a pressure fluid supply line 54 and the pressure fluid delivery line 48 and to shut off communication between an exhaust line 55 and a pressure fluid return pipe 56 which communicates with line 48. The valve member 53 provides communication between the return pipe 56 and the exhaust line 55 and shuts off communication between the line 54 and the pressure fluid delivery line 48 when valve member 53 is in another position in the valve casing. A valve stem 57 projects from one end of the valve casing and is pressed against a cam 58 by a spring 59 located between the valve member 53 and the valve casing. When the stem is on the high part of the cam 58, as shown, the valve member 53 is in its first described position in the casing whereat fluid is supplied to the cylinders 13 and 15 to raise the pistons therein. When the stem 57 is on the low part of the cam, the valve 53 will be in its second or exhaust position whereat fluid is discharged from those cylinders. A throttle valve 60 in line 48 provides means for throttling the flow of pressure fluid to the cylinders.

The valve structure shown in the drawing and as described is intended to represent any suitable valve structure and its operating mechanism. In actual practice, the valve controlling the supply and exhaust of air or other pressure fluid to and from the lower part of the cylinders 13 and 15 and operating mechanism therefor probably would be similar to those which are included in the Hartford-Empire I. S. forming machine and are disclosed in the aforesaid Ingle Patent 1,911,119.

As illustrated in the drawing, the timing of the upward stroke of the two plungers 20, 20 is independently controlled as is the throttling of the pressure fluid for effecting their separate strokes. To this end, the pistons 24, 25 operating in the right-hand cylinders 14, 16 are raised by fluid pressure from the supply line 54 through the separate cam actuated valve 51, delivery line 49, 49a and 49b, and throttle valve 60 which may be identical with their heretofore described counterparts. However, separate cam settings may be made for the two valves 50 and 51 to advance or retard the operation of one relative to the other as may be dictated by a difference in the viscosity of the two glasses to be pressed by the two plungers 20, 20 which the valves separately control. Similarly, separate throttle settings may be made so as to regulate separately the speed of upward travel of the two plungers to their pressing positions 61, 61.

The provision of multiple pistons spaced along the piston rod 23 makes possible the use of smaller pistons than would be necessary to apply the same power to the movement of the plunger, thus making possible the assembly of a double plunger operating mechanism having a cross section considerably smaller than would be necessary if a single piston air motor were used for each plunger.

In order to retract the plungers 20, 20 from their upper or pressing positions 61, 61 to their lowermost or fully retracted positions, motor control mechanism is provided, including a valve 63 which is similar in construction and mode of operation to the valves 50 and 51. The valve 63 is operatively connected with a branch 64 of the pressure fluid supply line 54. At its side opposite its connection with the branch 64, the valve 63 is connected by a pressure fluid delivery pipe 65 with passages 66, 67, 68, and 69 which respectively communicate with the upper part of the cylinders 13, 14, 15 and 16. A pressure fluid return branch 70 of the pipe 65 communicates with the valve 63 at one side thereof and an exhaust pipe 71 communicates with the valve 63 at a place opposite the connection of such valve with the pipe 65. The arrangement is such that pressure fluid will pass simultaneously from the line 54 through the valve 63 to the upper end of each of the cylinders 13, 14, 15 and 16 when the stem 72 of a spring pressed valve member 73 in the valve 63 is on the high part of a cam 74. Exhaust of pressure fluid from the upper part of each of the cylinders through part of the line 65, return line 70, valve 63 and exhaust line 71 takes place when the stem 72 is on the low part of the cam 74. As in the case of the valves 50 and 51, the valve 63 and its operating mechanism are representative of any suitable structure such, for example, as that which is included in the Hartford-Empire I. S.

forming machine as disclosed in the Ingle Patent No. 1,911,119.

The pressure fluid actuated downward strokes of the pistons 24, 25 effect simultaneous retraction of both pistons 20, 20, each being retracted from its uppermost or pressing position 61 past its charge receiving position 47, to a still lower position, which may be termed the neck-mold clearance position of the plunger. This may be the position for the plunger shown in full lines in the drawing. When each plunger reaches its charge receiving position 47 during its downstroke, its butt end will contact with the upper edge of its sleeve-lifting disk 41. Each disk 41 is held at this time in an elevated position by the action of its spring 42 which has forced the disked sleeve 40 upwardly until its flange contact 46 is against the adjustable stop screw 45. Further downward movement of the plungers 20, 20 in response to the actuation of the pistons 24, 25 by the pressure fluid in the upper part of the cylinders in which they operate, will cause the plunger lifting disks 41 and their integral sleeves 40 to move downwardly against the resistance of springs 42, 42, which are thereby compressed, until these parts reach the positions shown by the full lines in the drawing. This, as aforesaid, is the position of the plungers at which ample clearance is provided for bodily movement of the neck molds from the plunger guides to transfer the hollow parisons to laterally spaced stations for further forming treatment or for any other useful purpose. The parison transfer movement of each neck mold may be a bodily swinging movement thereof along an arcuate path such as is disclosed in my aforementioned copending application, Serial No. 410,747.

*Plunger cooling provisions*

Efficient formation of successive charges into hollow glass parisons is aided if the glass contacting portion of each of the plungers 20 is maintained at a temperature which is most suitable for the purpose and is as nearly uniform throughout its glass contacting surface as can be obtained. The invention provides means for simultaneously cooling the plungers internally to individually regulable extents, whereby the temperature of each plunger can be effectively regulated and controlled.

As shown in the drawing, a liquid discharge pipe 75 is provided in an axial bore 76 of each plunger 20, 20 and extends from the lower part of each plunger nearly to the tip of the latter in slightly spaced relation with the wall of each plunger bore 76. The lower part of each plunger bore may be enlarged at 77 to provide a drainage chamber which has inclined drainage passages 78 in the butt end of the plunger around the connected end portion of the piston rod. Each discharge pipe 75 may be threaded into the bore of a piston rod 23, the latter being hollow as indicated at 79. The drainage passages 78 discharge into the interior of the cylindrical holder bores 21, 21 which are connected by a common well 80 so that liquid discharged from the passages 78 of both plungers 20, 20 may drain to a common reservoir at the bottom of the holder bores and be gravity drained therefrom by a single drain pipe 81. The latter may lead to any suitable place at which the liquid is to be delivered.

A coolant such as water is supplied through a pair of stationary tubes 82, 82, each of which is secured to the lower head 11 and extends upwardly through a packing 83 in the lower part of a reciprocable piston rod 23. Each tube 82 is closed at its lower end by a plug 84 or by any other suitable means. A lateral intake port 85 in each tube 82 communicates respectively with liquid supply passages 86 and 87 in the lower head member 11. Separate liquid delivery pipes 88 and 89, each having its own throttle valve 90 or 91, respectively, connect the supply passages 86 and 87 with a pipe 92 leading from the delivery port 93 of a cooling liquid control valve 94. A cooling liquid supply line 95 is connected with the valve 94 and includes a flow regulator 96.

The valve 94 includes a movable valve member 97 cooperative with a valve seat 98 in the valve to permit or prevent communication between the supply line 95 and the delivery port 93, according to the position of the valve member 97. A spring 99 tends to maintain the valve member 97 on its seat 98 so as to shut off flow of coolant to the plungers 20, 20. The valve member 97 has a stem 100 extending through a packing 101 into operative contact with a cam 102. Rotation of the cam 102 is preferably timed to unseat the valve member 97 simultaneously with the upward or pressing movement of one or both plungers 20. This may be at the time one or both valves 50, 51 are actuated to supply air to the cylinders 13, 15, and 14, 16, beneath the pistons 24, 25.

The plunger cooling means described may be used to supply an individually throttled stream of cooling fluid, such as water, to the interior of each plunger 20. In some instances where less cooling will suffice, a coolant having a lower cooling value, as air, may be used. Spent cooling fluid may drain or exhaust from the plungers through the continuously open outlet passages 78 in the lower end portion of each plunger. The amount of cooling liquid may be regulated for both plungers by the regulator 96 and for the individual plungers by the throttles 90, 91. It has been found in actual practice that this mode of cooling permits effective control of the temperature of the glass contacting portion of each plunger. The cooling arrangement and mode of use also make the cooling passages of the plungers self-cleaning.

*Air for "puff blowing" and other uses*

The improved multiple-plunger operating mechanism of the present invention also includes means for supplying air under pressure to the interior of the forming units or to the interior of the hollow glass parisons therein, if desired. As shown in the drawing, an air supply passage 102a is formed in a wall of the guide casting 32 and communicates through an annular passage 103 in the guide 32 with the space within each guide wall 31, ring support 35 and neck mold 36. Air may be supplied to the passage 102a and thence to the communicating passage 103 at an appropriate time for an air delivery line 104 under the control of a valve 105. The latter may be actuated by a cam 106, as in the case of the valves 50 and 51, so that air from a source of supply, indicated by the line 107, may pass through the valve 105 when the stem 108 of a valve member 109 in the valve 105 is on the high portion of the cam 106. Communication between the lines 104 and 107 is shut off by the valve 105 when the stem 108 is on the low portion of the cam. If desired, provisions similar to those shown for the valves 50, 51 and 63 may be made for exhausting air from the communicating passages 102a, 103.

In actual practice, the valve 105 controlling the supply of air to and through the passages 102a, 103, etc., preferably would be constructed and controlled as disclosed in the aforesaid Ingle Patent No. 1,911,119. The valve structure shown is intended to represent any suitable valve structure for controlling the supply of air under pressure for "puff" blowing of parisons that have been formed in the forming unit or for any other useful purpose.

In practice, it may be desirable to apply air to the hollow parisons at or immediately after the withdrawal of the plungers 20, 20 to prevent sticking of any portion of the glass to the plungers, to prevent collapse of any portion of the parisons or even to expand them slightly.

It will be understood that the invention is not limited to the exact details of the structure shown in the drawing and hereinbefore specifically described as various modifications thereof and changes therein will readily occur to those skilled in the art.

What I claim is:

1. In glassware forming apparatus, the combination with a plurality of inverted press molds open at their lower ends and located at a glass charge pressing station, of a plurality of pressing plungers, each tapering externally toward its tip for part of its length, and means for guiding, positioning and operating said plungers to dispose them in axial alignment with said inverted press molds with their tips uppermost and to move each of them upward from a lowermost, mold clearance position of its tip to a higher initial glass charge contacting and supporting position within a press mold, thence to a still higher position within its press mold to press the glass of a charge on each plunger tip against the internal walls of its press mold to form a body therein, each of said plungers being of sufficient length to extend upwardly within its inverted press mold from the lower end of the latter for the greater part of the length of the cavity of said mold when the plunger is at its glass pressing position in said press mold, and finally downward past said second named position to said lowermost, mold clearance position, said operating means comprising a pressure fluid motor including a rod for each plunger operatively connected to that plunger, means for operating said pressure fluid motors to move each plunger individually from said initial glass charge contacting and supporting position upwardly to said still higher position within the press mold and thereafter simultaneously move all of said plungers downwardly to said lowermost, mold clearance positions, and resilient means rendered effective by the downward movement of each plunger to said lowermost, mold clearance position to move each plunger upwardly to said initial glass charge contacting and supporting position.

2. In glassware forming apparatus, the combination of a pair of parallel inverted press molds located at a glass charge pressing station, said molds being open at their lower ends, a pressing plunger for each mold, pneumatically operated means operatively connected to the plungers to move them vertically in co-axial relation with their respective press molds from a mold charge initial contact position in each of said press molds to a higher charge pressing position therein and thence downwardly past said initial contact position to a still lower, mold clearance position, said plungers being of sufficient length to extend upwardly within said inverted press molds from the lower ends of the latter nearly to the upper ends of the interior thereof when said plungers are at their said glass pressing positions, valve means associated with the pneumatic means for separately effecting movement of said plungers to their pressing positions, valve means for simultaneously effecting retraction of said plungers, and other means acting automatically after each downward movement of the plungers by said pneumatically operated means to said mold clearance positions to move said plungers upward to their said glass charge initial contact positions.

3. In glassware forming apparatus, the combination of a plurality of inverted press molds located at a glass charge pressing station and open at their lower ends, a pressing plunger for each mold, pneumatically operated means operatively connected to said plungers for individually moving them vertically in co-axial relation with said press molds from mold charge initial contact positions in said press molds to higher charge pressing positions therein and for simultaneously moving them downwardly past said initial contact positions to still lower mold clearance positions, other means acting automatically after each downward movement of the plungers by said pneumatically operated means to said mold clearance position to move said plungers upward to their said mold charge initial contact positions, and means for adjustably limiting the extent of upward movement of said plungers from said mold clearance positions by said other means to adjustably control the level within the press molds at which the upper ends of said plungers will be located when said plungers have been raised to their said glass charge initial contact positions.

4. In glassware pressing apparatus, a plurality of spaced parallel pressing plungers, a plurality of pneumatic cylinders for each plunger co-axially aligned with that plunger, a pressing mold for each plunger in axial alignment therewith, a piston rod for each plunger reciprocable in the co-axially aligned cylinders for that plunger, a piston in each of said cylinders operatively connected therein to said piston rod, means for supplying and exhausting fluid under pressure to and from the opposite ends of the cylinders to effect reciprocation of said pistons therein, including means for regulating the flow of said fluid to the cylinders for the several rods so as to effect separate actuation of each rod in one direction and simultaneous actuation of all of the rods in the opposite direction.

5. In glassware pressing apparatus, a plurality of spaced parallel pressing plungers, a plurality of pneumatic cylinders for each plunger co-axially aligned with that plunger, a pressing mold for each plunger located in axial alignment with that plunger, a piston rod for each plunger reciprocable in the co-axially aligned cylinders for that plunger, a piston in each of said cylinders operatively connected therein to the piston rod, means for supplying and exhausting fluid under pressure to and from the opposite ends of the cylinders to effect reciprocation of said pistons therein, including means for regulating the flow of said fluid to the cylinders for the several rods so as to effect separate actuation of each rod in one direction and simultaneous actuation of all of the rods in the opposite direction, a holder having a plurality of open topped cylindrical bores, each bore having a plunger in substantially concentric relation therewith, plunger positioning means disposed within each holder bore, said positioning means for each plunger including a vertically movable cylindrical sleeve reciprocable vertically in its holder, a coil spring acting when compressed to urge said sleeve upward within said holder bore, a vertically adjustable stop member for limiting the upward movement of all of the sleeves in said holder, and a vertically movable plunger lifting disk surrounding each of said piston rods within its holder bore beneath its plunger and rigidly connected with the associated vertically movable sleeve to cause compression of the spring on downward movement of the associated plunger to its lowermost position and lifting of the plunger from said lowermost position on exhaust of air from the upper part of the pneumatic cylinders associated therewith.

6. In glassware forming apparatus a plurality of glass pressing plungers, individual fluid motors for said plungers operatively connected thereto, independently regulable means individual to said motors to supply operating fluid thereto to effect movement of said plungers independently of one another in one direction and means common to all said motors to supply operating fluid thereto to effect movement of said plungers simultaneously in the opposite direction.

7. In glassware forming apparatus a plurality of internally fluid cooled glass pressing plungers, individual fluid motors for said plungers operably connected thereto, independently regulable means individual to said motors to supply operating fluid thereto to effect movement of said plungers in one direction, means common to all said motors to supply fluid thereto to effect movement of said plungers in the opposite direction and means to regulably control the distribution to each of said fluid cooled plungers of a regulated total amount of cooling fluid.

8. In glassware forming apparatus, a plurality of internally liquid cooled juxtaposed, inverted glass pressing plungers, means for effecting successive reciprocation cycles of said plungers, means for simultaneously supplying cooling fluid to said plungers during a portion only of said cycles, and means for effecting independent regulation of the distribution to each plunger of a regulated total amount of cooling fluid.

9. In glassware forming apparatus a plurality of internally liquid cooled juxtaposed, inverted glass pressing plungers mounted for vertical reciprocation in a housing, means for effecting successive reciprocation cycles of said plungers, means for simultaneously supplying a predetermined total amount of cooling fluid to said plungers during a portion only of each cycle, a common well in said housing into which spent cooling fluid from said plungers drains, and means for independently regulating the cooling fluid supplied to each of said plungers.

GEORGE E. ROWE.

REFERENCES CITED

The following references are of record in the file of this patent:

UNITED STATES PATENTS

| Number | Name | Date |
|---|---|---|
| 1,039,700 | Crawford | Oct. 1, 1912 |
| 1,057,198 | Winder | Mar. 25, 1913 |
| 1,466,867 | Winder | Sept. 4, 1923 |
| 1,843,160 | Ingle | Feb. 2, 1932 |
| 1,911,119 | Ingle | May 23, 1933 |
| 1,957,410 | Miller, Jr. | May 1, 1934 |
| 2,011,980 | Miller | Aug. 20, 1935 |
| 2,289,046 | Rowe | July 7, 1943 |